(12) United States Patent
Yu

(10) Patent No.: US 11,861,160 B2
(45) Date of Patent: Jan. 2, 2024

(54) WRITING INTERACTION METHOD, SMART INTERACTIVE DISPLAY DEVICE AND WRITING INTERACTION SYSTEM

(71) Applicant: SHENZHEN HITEVISION TECHNOLOGY CO., LTD., Guangdong (CN)

(72) Inventor: Zipeng Yu, Guangdong (CN)

(73) Assignee: SHENZHEN HITEVISION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/913,853

(22) PCT Filed: Jul. 6, 2020

(86) PCT No.: PCT/CN2020/100379
§ 371 (c)(1),
(2) Date: Sep. 23, 2022

(87) PCT Pub. No.: WO2021/189706
PCT Pub. Date: Sep. 30, 2021

(65) Prior Publication Data
US 2023/0315282 A1 Oct. 5, 2023

(30) Foreign Application Priority Data
Mar. 24, 2020 (CN) .......................... 202010213966.9

(51) Int. Cl.
*G06F 3/04883* (2022.01)
*G06F 3/0354* (2013.01)

(52) U.S. Cl.
CPC ...... *G06F 3/04883* (2013.01); *G06F 3/03545* (2013.01); *G06F 2203/0382* (2013.01)

(58) Field of Classification Search
CPC ............... G06F 3/03545; G06F 3/0442; G06F 3/04162; G06F 3/0441; G06F 2203/04104;
(Continued)

(56) References Cited

U.S. PATENT DOCUMENTS 10,606,382 B2 * 3/2020 Yamamoto ............ G06F 3/0446
10,698,524 B2 * 6/2020 Park .................... G06F 3/04162
(Continued)

FOREIGN PATENT DOCUMENTS

CN 104571815 A 4/2015
CN 105320390 A 2/2016
(Continued)

OTHER PUBLICATIONS

PCT International Search Report for PCT/CN2020/100379, dated Jan. 4, 2021, 11 pages.
(Continued)

*Primary Examiner* — Koosha Sharifi-Tafreshi
(74) *Attorney, Agent, or Firm* — East IP P.C.

(57) ABSTRACT

A writing interaction method, a smart interactive display device and a writing interaction system are provided. The writing interaction method includes: detecting a first touch event of one or more smart pens and acquiring one or more corresponding identifiers of the one or more smart pens (S100); generating handwriting according to the first touch event (S102A), and determining whether the generated handwriting corresponds to multiple smart pens of the smart pens according to the identifiers of the smart pens (S102B); under a condition that the handwriting corresponds to the multiple smart pens, generating multiple non-overlapping writing regions, wherein the multiple writing regions are in one-to-one correspondence with the multiple smart pens, each writing region covers handwriting of a corresponding
(Continued)

smart pen, and each writing region only responds to a touch event of the corresponding smart pen for generating handwriting (S104).

9 Claims, 10 Drawing Sheets

(58) Field of Classification Search
 CPC . G06F 2203/04803; G06F 2203/04808; G06F 2203/0382
 USPC ........................................ 345/179; 178/19.01
 See application file for complete search history.

(56) References Cited

U.S. PATENT DOCUMENTS

| | | | |
|---|---|---|---|
| 11,086,419 B2* | 8/2021 | Sakamoto | G06F 3/0383 |
| 2013/0050101 A1 | 2/2013 | Lu et al. | |
| 2013/0328805 A1 | 12/2013 | Kim | |

FOREIGN PATENT DOCUMENTS

| | | |
|---|---|---|
| CN | 106339135 A | 1/2017 |
| CN | 106547402 A | 3/2017 |
| CN | 106775314 A | 5/2017 |
| CN | 107491210 A | 12/2017 |
| CN | 107515690 A | 12/2017 |
| CN | 108319391 A | 7/2018 |
| CN | 108829327 A | 11/2018 |
| CN | 108919983 A | 11/2018 |
| CN | 109840046 A | 6/2019 |
| CN | 111352570 A | 6/2020 |

OTHER PUBLICATIONS

The First Office Action for Chinese Application No. 202010213966.9, dated Dec. 11, 2020, 9 pages.
The Notification to Grant Patent Right for Invention for Chinese Application No. 202010213966.9, dated Apr. 26, 2021, 6 pages.

* cited by examiner

1

WRITING INTERACTION METHOD, SMART INTERACTIVE DISPLAY DEVICE AND WRITING INTERACTION SYSTEM

CROSS-REFERENCE TO RELATED APPLICATIONS

The present application is a National Stage of International Application No. PCT/CN2020/100379 filed on Jul. 6, 2020, which claims priority to Chinese patent application No. 202010213966.9, filed on Mar. 24, 2020 and entitled "WRITING INTERACTION METHOD, SMART INTERACTIVE DISPLAY DEVICE AND WRITING INTERACTION SYSTEM", both of which are hereby incorporated by reference in their entireties.

TECHNICAL FIELD

The present application relates to a technical field of interaction between users and computers, and in particular to a writing interaction method, a smart interactive display device and a writing interaction system.

BACKGROUND

Smart interactive display devices, such as smart interactive tablets, are increasingly being used in various fields, such as education and teaching, corporate meetings, business presentations and other fields. In order to better realize the interactive function, the existing smart interactive display device is also used together with a smart pen, and the writing control can be realized through the communication connection between the smart pen and the smart 25 interactive display device. However, when the application of writing on the blackboard is provided for multiple people at the same time, multiple smart pens actually share the same writing region, so there are some problems as follows. For example, when several people are required to hold smart pens and write on the blackboard at the same time, since everyone's handwriting, writing habits and writing layout are different, some people are more casual about the writing layout, thereby generating a chaotic writing layout, and occupying other people's writing space. Thus, due to the problem of chaotic writing layout, their own writing space is wasted, and their writing content may occupy other people's writing space, resulting in a chaotic writing layout of the entire page, and the viewers can't even distinguish the writing content written by different people. It can be seen that the current smart interactive display device can provide poor user experience in dealing with multiple people operating smart pens for writing.

SUMMARY

The embodiments of the present application provide a writing interaction method applied to the interaction between a smart interactive display device and a smart pen, wherein the writing interaction method includes:
  detecting a first touch event of one or more smart pens and acquiring one or more corresponding identifiers of the one or more smart pens;
  generating handwriting according to the first touch event, and determining whether the generated handwriting corresponds to multiple smart pens of the smart pens according to the identifiers of the smart pens;
  under a condition that the handwriting corresponds to the multiple smart pens, generating multiple non-overlapping writing regions, wherein the multiple writing regions are in one-to-one correspondence with the multiple smart pens, each writing region covers handwriting of a corresponding smart pen, and each writing region only responds to a touch event of the corresponding smart pen for generating handwriting.

The embodiments of the present application further provide a smart interactive display device for interacting with a smart pen, the smart interactive display device including a touch event matching module, a touch event response module, and a writing region generation module, wherein:
  the touch event matching module includes a touch detection unit and a touch matching unit, the touch detection unit is configured to detect a first touch event of one or more smart pens, and the touch matching unit is configured to acquire one or more identifiers of the one or more smart pens and match the corresponding first touch event;
  the touch event response module includes a handwriting generation unit and a quantity monitoring unit, the handwriting generation unit is configured to generate handwriting corresponding to the first touch event; the quantity monitoring unit is configured to determine whether the generated handwriting corresponds to multiple smart pens of the smart pens according to the identifiers of the smart pens;
  the writing region generation module includes a matching generation unit and a response control unit, the matching generation unit is configured to generate multiple non-overlapping writing regions under a condition that the generated handwriting corresponds to the multiple smart pens, wherein the multiple writing regions are in one-to-one correspondence with the multiple smart pens, and each writing region covers handwriting of a corresponding smart pen; and the response control unit is configured to control each writing region to only respond to a touch event of the corresponding smart pen for generating handwriting.

The embodiments of the present application further provide a smart interactive display device, including a capacitive touch screen, a processor and a computer-readable storage medium, wherein the computer-readable storage medium stores a writing interaction program, and the writing interaction program, when being executed, implements the writing interaction method as described above.

The embodiments of the present application further provide a writing interaction system, including a smart pen and the smart interactive display device as described above, wherein the smart interactive display device includes a touch event matching module, a touch event response module, and a writing region generation module, wherein:
  the touch event matching module includes a touch detection unit and a touch matching unit, the touch detection unit is configured to detect a first touch event of one or more smart pens, and the touch matching unit is configured to acquire one or more identifiers of the one or more smart pens and match the corresponding first touch event;
  the touch event response module includes a handwriting generation unit and a quantity monitoring unit, the handwriting generation unit is configured to generate handwriting corresponding to the first touch event; the quantity monitoring unit is configured to determine whether the generated handwriting corresponds to multiple smart pens of the smart pens according to the identifiers of the smart pens;

the writing region generation module includes a matching generation unit and a response control unit, the matching generation unit is configured to generate multiple non-overlapping writing regions under a condition that the generated handwriting corresponds to the multiple smart pens, wherein the multiple writing regions are in one-to-one correspondence with the multiple smart pens, and each writing region covers handwriting of a corresponding smart pen; and the response control unit is configured to control each writing region to only respond to a touch event of the corresponding smart pen for generating handwriting.

The embodiments of the present application further provide a writing interaction system, including a smart pen and the smart interactive display device as described above, wherein the smart interactive display device includes a capacitive touch screen, a processor and a computer-readable storage medium, wherein the computer-readable storage medium stores a writing interaction program, and the writing interaction program, when being executed, implements the writing interaction method as described above.

BRIEF DESCRIPTION OF THE DRAWINGS

Preferred embodiments of the writing interaction method, the smart interactive display device and the writing interaction system according to the present application will be described below with reference to the accompanying drawings, in which.

DETAILED DESCRIPTION

Figure 1:
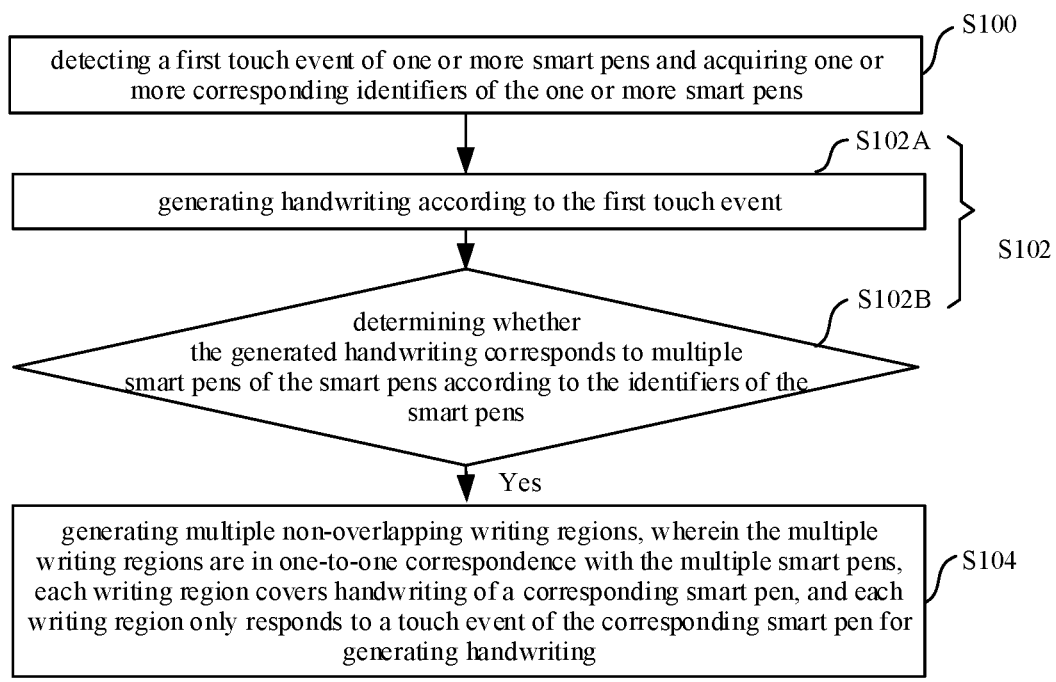
FIG. 1 is a flowchart of a first embodiment of a writing interaction method according to the present application.

The embodiments of the present application provide a writing interaction method applied to the interaction between a smart interactive display device and a smart pen. Please refer to FIG. 1, FIG. 1 is a flowchart of a first embodiment of a writing interaction method according to the present application. The writing interaction method includes step 100.

Step 100: detecting a first touch event of one or more smart pens and acquiring one or more corresponding identifiers of the one or more smart pens.

Figure 9:
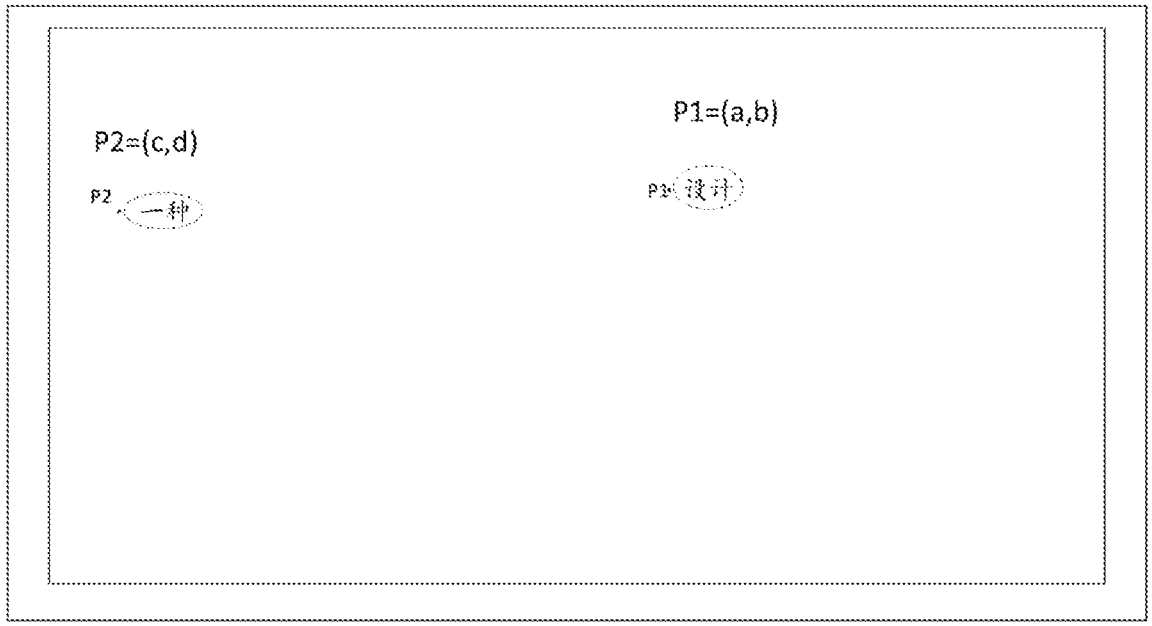
FIG. 9 is a first state schematic diagram of an implementation process of a writing interaction method according to the present application.

In this step, the smart pens may generate a touch event on a screen of the smart interactive display device, the touch event includes the above first touch event, and the type of the touch event can be capacitive touch, infrared touch and the like. At the same time, a communication connection is established between the smart pens and the smart interactive device, and the connection between the smart pens and the smart interactive device may transmit the identifiers of the smart pens. For example, an active capacitive pen may establish a communication connection with a touch panel card of a capacitive touch screen through Microsoft Pen Protocol (MPP) of Microsoft or proprietary Active Electrostatic Solution (AES) of Wacom, and transmit its own identifier. It can be understood that, the smart pen may also transmit its own identifier through the electromagnetic induction input technology or the infrared communication technology. The touch events of different smart pens may occur simultaneously or sequentially. From the perspective of application, although there are multiple people operating the smart pens at the same time, the start time of the writing of each person is generally not exactly the same. Technically speaking, it is easier to match touch events that occur one after the other with the corresponding identifiers of the smart pens. As shown in FIG. 9, the initial stroke of the character "一种" is a horizontal line, and the initial stroke of the character "设计" is a dot. The time when the initial positions of the two strokes are generated can be simultaneous or sequential.

The writing interaction method further includes step 102: generating handwriting according to the first touch event, and determining whether the generated handwriting corresponds to multiple smart pens of the smart pens according to the identifiers of the smart pens.

In this step, in the example shown in FIG. 1, although step 102A of generating handwriting is arranged before step 102B of determining the number of the smart pens, determining the number of the smart pens is actually determining the occurred first touch event belongs to which smart pen(s) and then determining the number of the smart pens according to the identifiers of the smart pens. Therefore, apparently, the handwriting is associated with the identifiers of the smart pens, and substantially, the first touch event is associated with the identifiers of the smart pens. Therefore, the sequence between step 102A and step 102B may not be limited. In addition, step 102B can also be performed after the first touch event occurs. For example, in FIG. 9, the determination of step 102B is completed after the writing of the words "一种" and "设计" is completed.

The writing interaction method further includes step 104: under a condition that the handwriting corresponds to the multiple smart pens, generating multiple non-overlapping writing regions, wherein the multiple writing regions are in one-to-one correspondence with the multiple smart pens, each writing region covers handwriting of a corresponding smart pen, and each writing region only responds to a touch event of the corresponding smart pen for generating handwriting.

Figure 10:
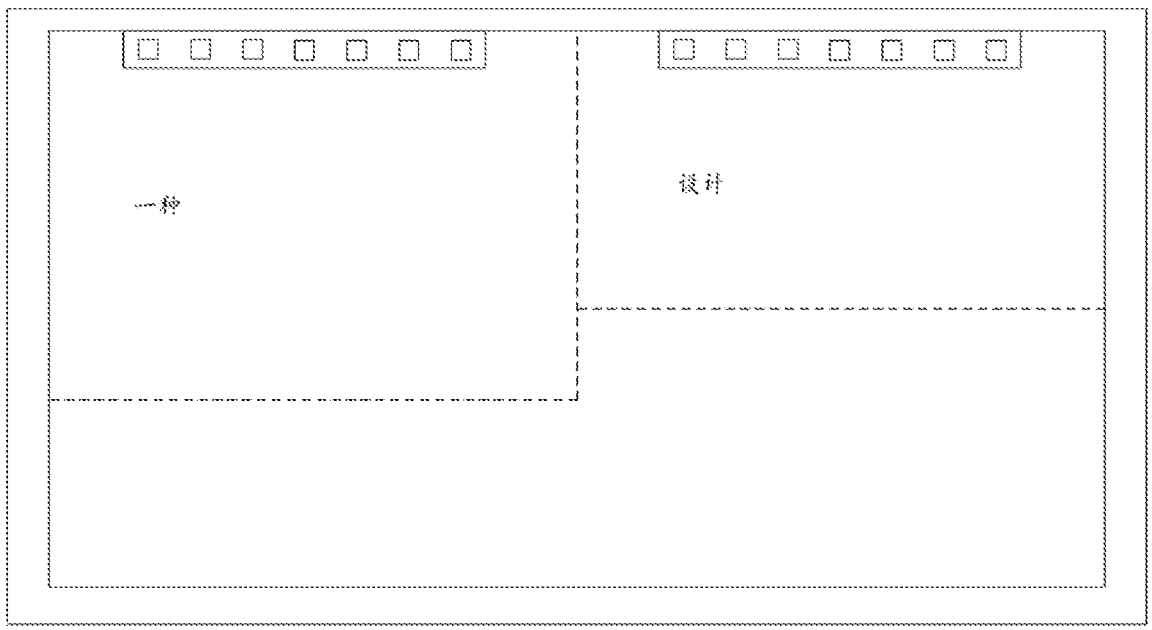
FIG. 10 is a second state schematic diagram of an implementation process of a writing interaction method according to the present application.

In this step, under a condition that multiple writing regions are generated, it is not necessary to completely fill the entire display region of the smart interactive display device. Optionally, the size and position of the writing region may be determined according to the customary size and the position where the initial first touch event occurs. For example, the two writing regions generated in FIG. 10 are set adjacent to the upper side of the display region, and according to the default left-aligned typesetting mode, the left border of the writing region is placed close to the position where the initial first touch event occurs, that is, the position where the initial handwriting is generated. The left and right writing regions in FIG. 10 do not overlap with each other, but in order to make full use of the display region, the two writing regions can share a common border. It is understandable that the writing region can be determined in the form of a graphic window, or can be defined by only colored lines. After multiple writing regions are generated, since all writing regions are independent of each other, suppose that the left writing region in FIG. 10 belongs to the smart pen marked 010, and the right writing region belongs to the smart pen marked 011. Then, under a condition that the smart pen marked 011 is writing in the left writing region, it will not be responded as displaying handwriting. It is understandable that if the handwriting corresponds to only one smart pen, the default writing region, such as the display region of the entire display screen, is used; or only a suitable size of writing region is generated for the smart pen.

According to the writing interaction method, the smart interactive display device and the writing interaction system provided by the embodiments of the present application, the generation source of the first touch event (that is, the smart pens) may be identified. Under a condition that it is detected that the written handwriting comes from multiple smart pens, a corresponding number of writing regions may be automatically generated. Each writing region covers handwriting of a corresponding smart pen, and each writing region only responds to a touch event of the corresponding smart pen for generating handwriting. Therefore, it is ensured that when multiple people use multiple pens to write, the generated multiple writing regions are independent of each other, the content generated by different smart pens will not be cluttered, and the writing content will be clear, thereby improving the user experience of multiple people operating smart pens for writing. In addition, the writing region is generated by matching the initial handwriting of each smart pen, in other words, the writing region is generated with the initial handwriting of each smart pen, and is positioned according to the initial handwriting. Therefore, a more flexible region layout can be realized, thereby adapting to different application scenarios.

Figure 2:
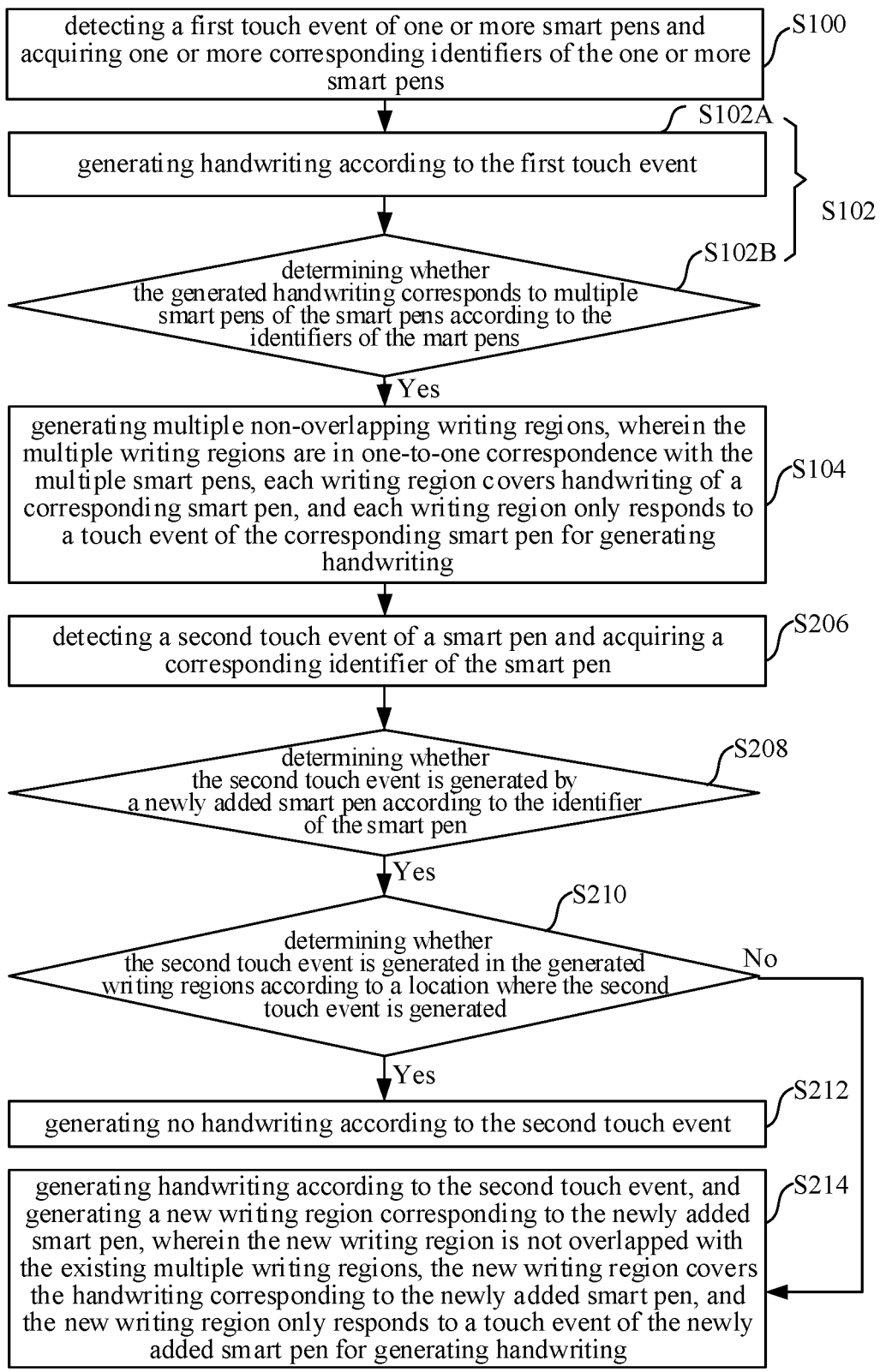
FIG. 2 is a flowchart of a second embodiment of a writing interaction method according to the present application.

Further, please refer to FIG. 2. FIG. 2 is a flowchart of a second embodiment of a writing interaction method according to the present application. After the step 104, the writing interaction method further includes step 206.

Step 206: detecting a second touch event of a smart pen and acquiring a corresponding identifier of the smart pen.

This step is used to detect the touch event of the smart pen again after the latest generation of the writing regions, that is, to detect the second touch event of the smart pen and match the identifier of the smart pen corresponding to the second touch event. By associating each touch event of the smart pen with the corresponding identifier of the smart pen, a data basis can be provided for subsequent smart control.

The writing interaction method further includes step 208: determining whether the second touch event is generated by a newly added smart pen according to the identifier of the smart pen.

In this step, although the second touch event has been detected in the previous step, it is not necessary to display corresponding handwriting immediately in response to the second touch event. Since each touch event is associated with the identifier of the smart pen, by querying the data of the identifiers of the smart pens, whether an identifier of a new smart pen is added can be determined, and thus whether the new smart pen or an operator of the new smart pen is added can be indirectly determined.

The writing interaction method further includes step 210: under a condition that the second touch event is generated by the newly added smart pen, determining whether the second touch event is generated in the generated writing regions according to a location where the second touch event is generated.

In this step, since the identifier of the smart pen corresponding to the second touch event is the identifier of the newly added smart pen, there is no existing writing region matching the second touch event. In order to determine an appropriate response, it is necessary to firstly know whether the location where the second touch event is generated is located in the remaining region outside the writing regions in the display region or in any existing writing regions.

The writing interaction method further includes step 212: under a condition that the second touch event is generated in the generated writing regions, generating no handwriting according to the second touch event.

In this step, the principle is that the existing writing regions are prioritized and their sizes are not adjusted. Under a condition that the second touch event occurs in the existing writing regions, in order to ensure the independence of the existing writing regions relative to the newly added smart pen, the second touch event of the newly added smart pen is not responded and no handwriting is generated. For example, referring to FIG. 10, under a condition that a third smart pen with an identification number of 001 is added, then no handwriting is generated if the smart pen with the identification number of 001 writes in any of the left and right writing regions in FIG. 10.

The writing interaction method further includes step 214: under a condition that the second touch event is not generated in the generated writing regions, generating handwriting according to the second touch event, and generating a new writing region corresponding to the newly added smart pen, wherein the new writing region is not overlapped with the existing multiple writing regions, the new writing region covers the handwriting corresponding to the newly added smart pen, and the new writing region only responds to a touch event of the newly added smart pen for generating handwriting.

In this step, the principle is that the existing writing regions are prioritized and their sizes are not adjusted. Under a condition that the second touch event is generated in the remaining region of the display region, in order to comprehensively respond to the second touch event of the newly added smart pen and generate corresponding handwriting, a new writing region is generated for the newly added smart pen. For example, referring to FIG. 10, under a condition that a third smart pen with an identification number of 001 is newly added, a new writing region is generated if the second touch event of the smart pen is generated near the lower edge of the display region and outside the existing left and right writing regions.

In this embodiment, by establishing the principle of giving priority to the existing writing regions, the high independence of the existing writing regions can be ensured. Further, within the remaining region of the display region, a new writing region can be generated for the second touch event of the newly added smart pen, thereby ensuring a certain flexibility.

Figure 3:
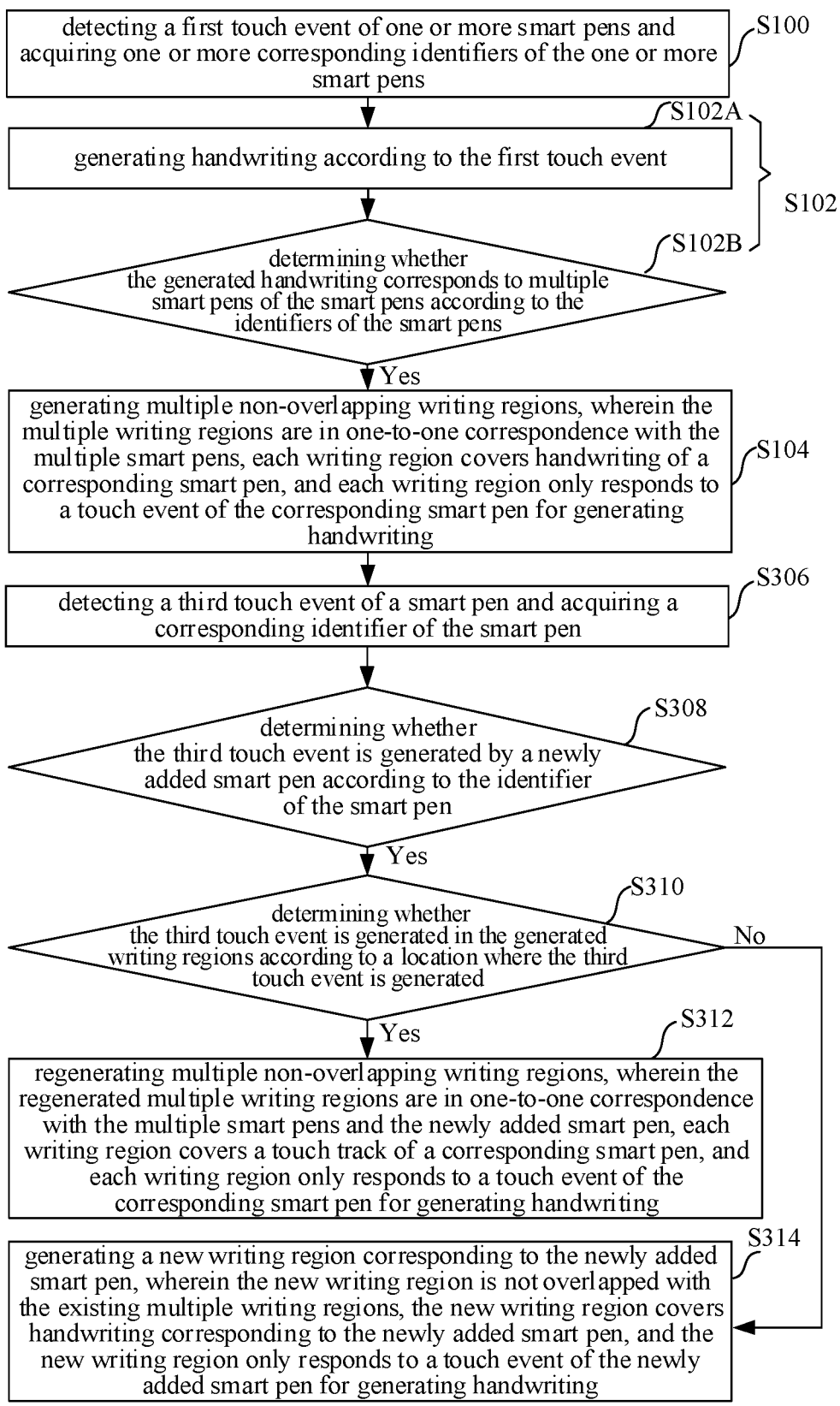
FIG. 3 is a flowchart of a third embodiment of a writing interaction method according to the present application.

Further, please refer to FIG. 3. FIG. 3 is a flowchart of a third embodiment of a writing interaction method according to the present application. After the step 104, the writing interaction method further includes steps 306, 308 and 310.

Step 306: detecting a third touch event of a smart pen and acquiring a corresponding identifier of the smart pen.

Step 308: determining whether the third touch event is generated by a newly added smart pen according to the identifier of the smart pen.

Step 310: under a condition that the third touch event is generated by the newly added smart pen, determining whether the third touch event is generated in the generated writing regions according to a location where the third touch event is generated.

In this step, on the basis that the response strategy for the newly added smart pen is determined, in order to execute the corresponding strategy smoothly, it is necessary to firstly know whether the location where the third touch event is generated is located in the remaining region outside the writing regions in the display region or in any existing writing regions.

The writing interaction method further includes step 312: under a condition that the third touch event is generated in the generated writing regions, regenerating multiple non-overlapping writing regions, wherein the regenerated multiple writing regions are in one-to-one correspondence with the multiple smart pens and the newly added smart pen, each writing region covers a touch track of a corresponding smart pen, and each writing region only responds to a touch event of the corresponding smart pen for generating handwriting.

In this step, since it is determined that the newly added smart pen has priority to the existing writing regions, each time a new smart pen is added, the multiple writing regions need to be regenerated. For example, under a condition that the third touch event of the newly added smart pen falls in the left or right writing region, the multiple writing regions need to be regenerated. For example, under a condition that the newly added smart pen writes "交互" between the words "一种" and "设计", the regenerated writing regions can include three writing regions (left, middle and right), with the word "交互" in the middle writing region.

The writing interaction method further includes step 314: under a condition that third touch event is not generated in the generated writing regions, generating a new writing region corresponding to the newly added smart pen, wherein the existing multiple writing areas remain unchanged, wherein the new writing region is not overlapped with the existing multiple writing regions, the new writing region covers handwriting corresponding to the newly added smart pen, and the new writing region only responds to a touch event of the newly added smart pen for generating handwriting.

In this step, under a condition that the third touch event of the newly added smart pen falls in the remaining region of the display region, a new writing region is generated for the newly added smart pen, and the existing multiple writing regions remain unchanged. In this way, the third touch event of the newly added smart pen can be flexibly responded, and the independence of the existing writing regions can be maintained. For example, under a condition that the third touch event of the newly added smart pen occurs at the lower right corner of the display region, then a new writing region is generated for the newly added smart pen at the lower right corner, while keeping the original left and right writing regions unchanged.

In this embodiment, by establishing the principle of giving priority to the newly added smart pen, it can be ensured that a writing region can be generated for the newly added smart pen. It is understandable that by using this principle, the sizes of the existing writing regions can be adjusted if necessary.

Figure 4:
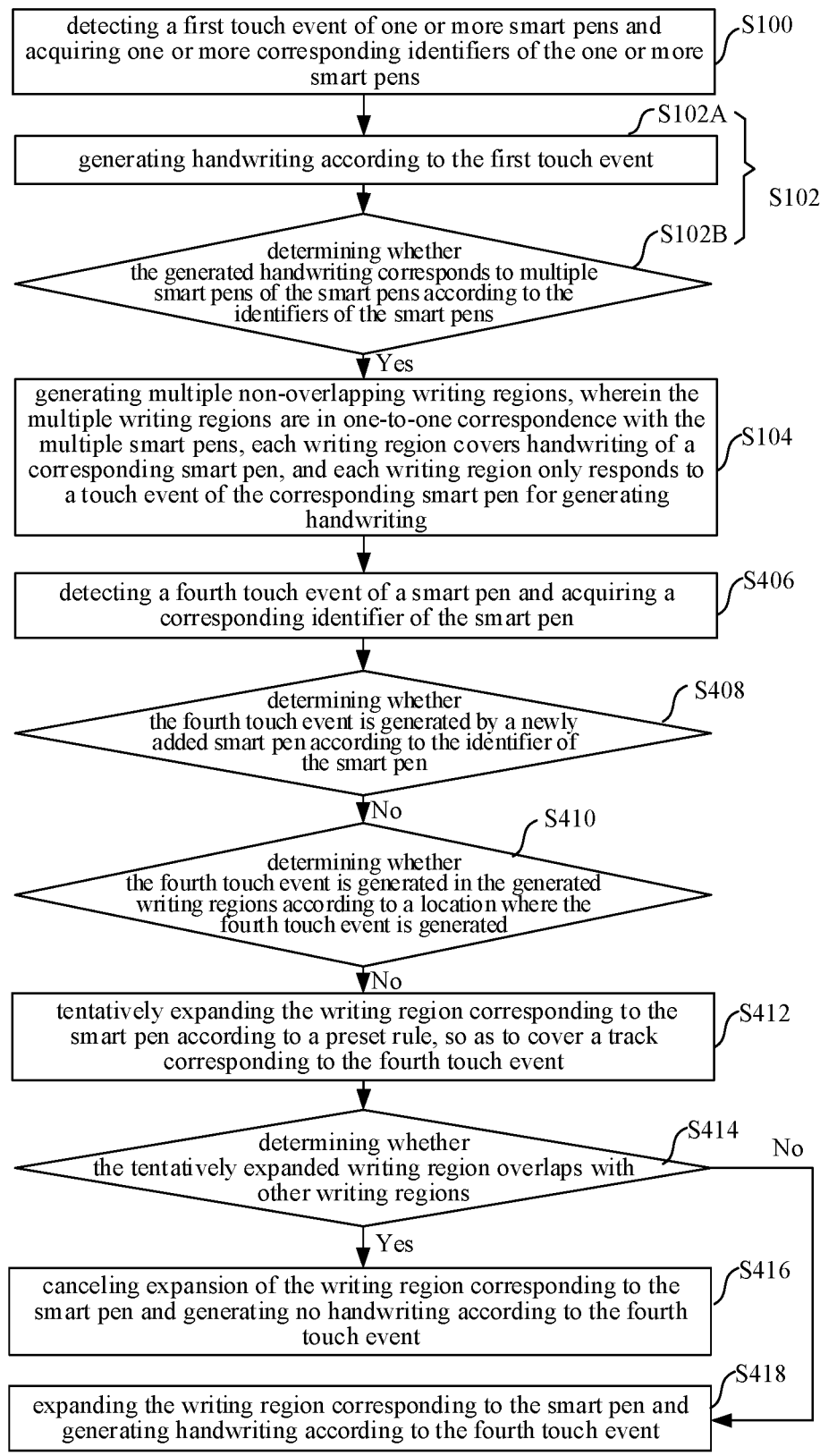
FIG. 4 is a flowchart of a fourth embodiment of a writing interaction method according to the present application.

Further, please refer to FIG. 4. FIG. 4 is a flowchart of a fourth embodiment of a writing interaction method according to the present application. The writing interaction method further includes steps 406, 408 and 410.

Step 406: detecting a fourth touch event of a smart pen and acquiring a corresponding identifier of the smart pen.

Step 408: determining whether the fourth touch event is generated by a newly added smart pen according to the identifier of the smart pen.

Step 410: under a condition that the fourth touch event is not generated by the newly added smart pen, determining whether the fourth touch event is generated in the generated writing regions according to a location where the fourth touch event is generated.

In this step, it is understandable that, in some application scenarios, whether it is an existing smart pen or a newly added smart pen, the fourth touch event generated by it may fall within the generated writing regions or may fall outside the generated writing regions. However, when considering whether to expand the generated writing regions, according to the principle of not overlapping with other writing regions, it is especially necessary to consider touch events that fall in the remaining region of the display region.

The writing interaction method further includes step 412: under a condition that the fourth touch event is not generated in the generated writing regions, tentatively expanding the writing region corresponding to the smart pen according to a preset rule, so as to cover a track corresponding to the fourth touch event.

In this step, the writing region is usually a rectangle, but in some embodiments, the writing region can also be other shapes, such as an ellipse. The preset rule is to expand the corresponding writing region according to the preset rule to cover the track of the fourth touch event. For example, please refer to FIG. 10, the right writing region belongs to the smart pen marked as 011. Under a condition that the smart pen marked as 011 generates a fourth touch event near the lower edge of the writing region, the right writing region can be tentatively expanded downward. Under a condition that the smart pen marked as 011 generates a fourth touch event near the left edge of the writing region, the right writing region can be tentatively expanded to the left.

The writing interaction method further includes step 414: determining whether the tentatively expanded writing region overlaps with other writing regions.

In this step, under the principle of ensuring the independence of the existing writing regions, not all tentative expansions are suitable, and the expanded region still needs to keep from overlapping with other writing regions.

The writing interaction method further includes step 416: under a condition that the tentatively expanded writing region overlaps with the other writing regions, canceling expansion of the writing region corresponding to the smart pen and generating no handwriting according to the fourth touch event.

In this step, for example, following the example in step 412, under a condition that the right writing region is extended to the left, the right writing region will overlap the left writing region. Therefore, the expansion of the right writing region should be canceled, and no handwriting will be generated according to the fourth touch event.

The writing interaction method further includes step 418: under a condition that the tentatively expanded writing region is not overlapped with the other writing regions, expanding the writing region corresponding to the smart pen and generating handwriting according to the fourth touch event.

In this step, for example, following the example in step 412, the right writing region is extended downward, for example, the right writing region expands downward until the lower edge is flush with the lower edge of the left writing region, thereby actually extending the writing region corresponding to the smart pen, and generating handwriting in respond to the fourth touch event.

In this embodiment, it is considered that the initially generated writing region may not be enough for writing. Therefore, under a condition that the touch event of the corresponding smart pen falls outside the original writing region, the original writing region may be tentatively expanded. Under the premise of not overlapping with other writing regions, the original writing region may be expanded, so as to more flexibly adapt to the needs of the users.

Further, under a condition that the handwriting corresponds to the multiple smart pens, the generating multiple non-overlapping writing regions specifically includes:

acquiring a location of a leftmost coordinate point of the handwriting corresponding to each smart pen;

determining whether a distance between two adjacent leftmost coordinate points is greater than or equal to a first preset distance;

under a condition that the distance between the two adjacent leftmost coordinate points is greater than or equal to the first preset distance, generating the multiple non-overlapping writing regions on a screen display region.

Further, under a condition that the distance between the two adjacent leftmost coordinate points is greater than or equal to the first preset distance, generating the multiple non-overlapping writing regions on a screen display region includes:

under a condition that the distance between the two adjacent leftmost coordinate points is greater than or equal to the first preset distance, except for a leftmost coordinate point close to a left side of the screen display region, forming the writing regions by setting vertical dividing lines referring to the other leftmost coordinate points, wherein the first preset distance is equal to a product of $\delta$ and L, L is a horizontal length of the screen display region, and $\delta$ is less than 0.5; or under a condition that the distance between the two adjacent leftmost coordinate points is greater than or equal to the first preset distance, forming the writing regions by using a vertical centerline of the screen display region as a dividing line, wherein the first preset distance is equal to L/2, where L is the horizontal length of the screen display region.

Figure 5:
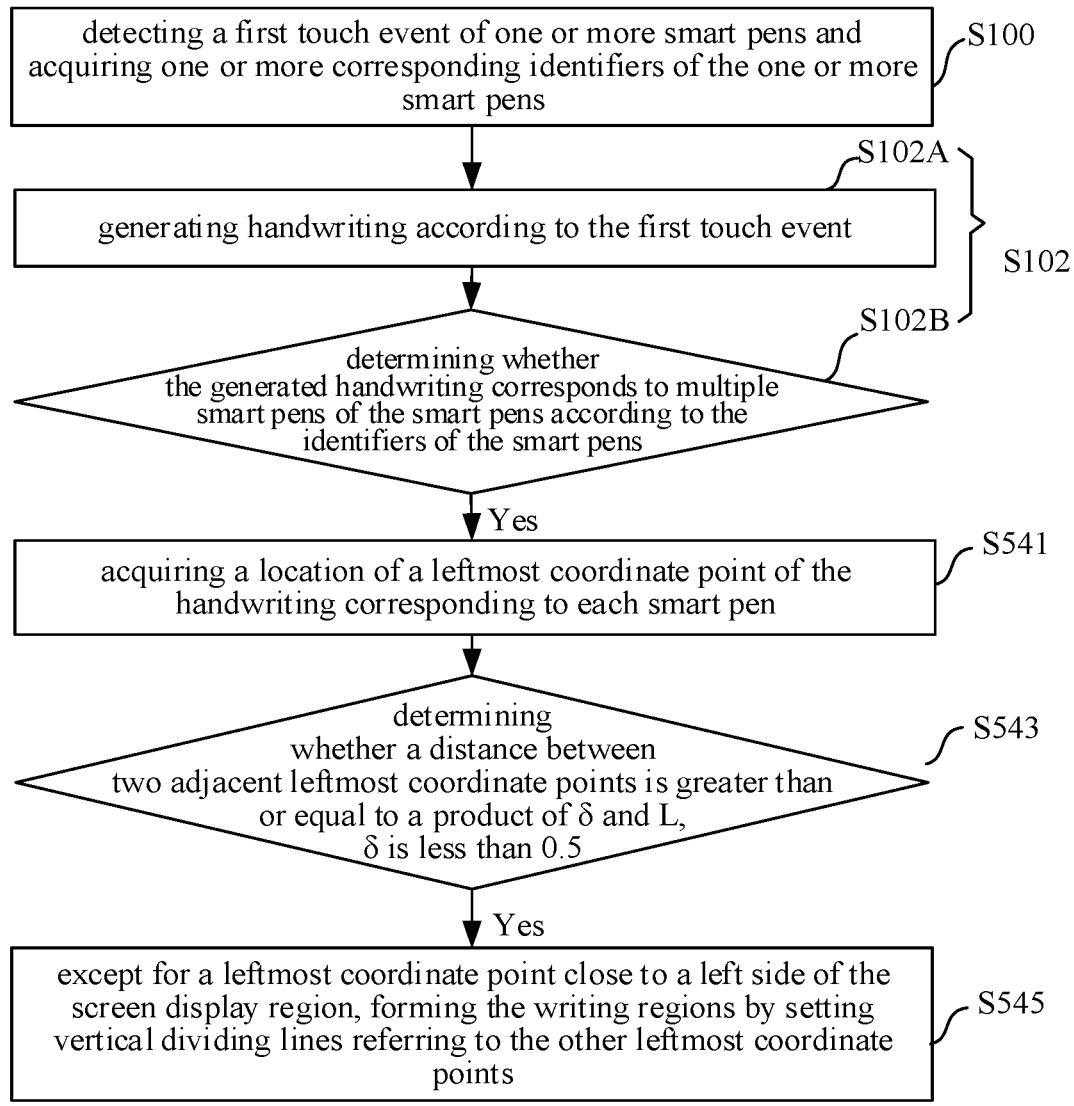
FIG. 5 is a flowchart of a fifth embodiment of a writing interaction method according to the present application.

Further, please refer to FIG. 5. FIG. 5 is a flowchart of a fifth embodiment of a writing interaction method according to the present application. The generating multiple non-overlapping writing regions specifically includes step 541.

Step 541: acquiring a location of a leftmost coordinate point of the handwriting corresponding to each smart pen.

In this step, since left alignment is the most commonly used typesetting method, in order to adapt to this typesetting method, the leftmost coordinate point of the handwriting of each smart pen is obtained as a reference point for generating the writing region. For example, in FIG. 9, the leftmost point of the word "一种" is P2, and its coordinates are (c, d), and the leftmost point of the word "设计" is P1, and its coordinates are (a, b).

The generating multiple non-overlapping writing regions further includes step 543: determining whether a distance between two adjacent leftmost coordinate points is greater than or equal to a product of $\delta$ and L, wherein L is a horizontal length of the screen display region, and $\delta$ is less than 0.5.

In this step, following the example in step 541, $\delta=\frac{1}{3}$, it is determined whether the distance between P1 and P2 is greater than or equal to L/3, that is, whether the value of a−c is greater than or equal to L/3. The distance can cover the possible horizontal length of the left handwriting among the two adjacent handwritings in the horizontal direction, thereby ensuring that a vertical dividing line can be set between the two handwritings. The horizontal lengths of the two handwritings are generally determined by the time required for determining the number of the smart pens, and the horizontal length is usually less than L/3. Of course, the time required for the determination can also be extended a little longer, so as to extend the length occupied by the initial handwriting of each smart pen.

The generating multiple non-overlapping writing regions further includes step 545: under a condition that the distance between the two adjacent leftmost coordinate points is greater than or equal to the product of $\delta$ and L, except for a leftmost coordinate point close to a left side of the screen display region, forming the writing regions by setting vertical dividing lines referring to the other leftmost coordinate points.

In this step, for the leftmost coordinate point close to the left side of the screen display region, the writing region corresponding to the handwriting can be bounded by the left side of the display region, like the left writing region in FIG. 10. For the handwriting of the other smart pens, the corresponding writing regions may be formed by setting vertical dividing lines referring to the leftmost coordinate points in turn. It is understandable that the most basic principle of "referring" is not to divide handwriting. Therefore, for example, the most extreme value of the boundary line X in the left writing region in FIG. 10 is X=a, and a is the abscissa of P1. On this basis, the dividing line X can be shifted to the left by a certain distance, that is, X=a−a1, a1 is a constant, such as a1=5 cm, which can be different according to the size of the screen in practice.

In this embodiment, the touch screen of the smart interactive display device is usually a wide screen, such as a 16:9 wide screen, and multiple people are standing along the horizontal direction in sequence when writing. Therefore, under a condition that multiple people are writing at the same time, it is also appropriate to only consider dividing the display region horizontally to generate the writing regions, and the algorithm required for this setup is relatively simpler.

Figure 6:
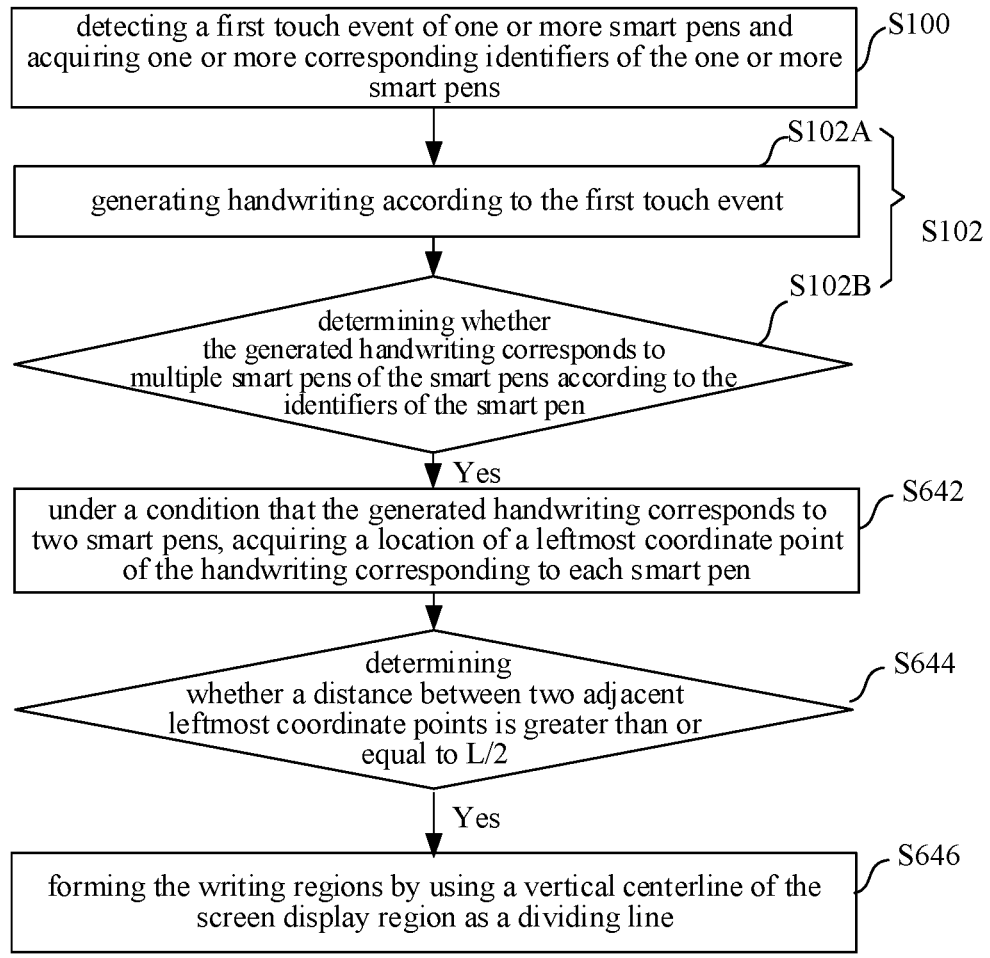
FIG. 6 is a flowchart of a sixth embodiment of a writing interaction method according to the present application.

Further, please refer to FIG. 6. FIG. 6 is a flowchart of a sixth embodiment of a writing interaction method according to the present application. The step 104 specifically includes step 642.

Step 642: under a condition that the handwriting corresponds to the multiple smart pens, and under a condition that the generated handwriting corresponds to two smart pens, acquiring a location of a leftmost coordinate point of the handwriting corresponding to each smart pen.

In this step, which is the same as step 541, since left alignment is the most commonly used typesetting method, in order to adapt to this typesetting method, the leftmost coordinate point of the handwriting of each smart pen is obtained as a reference point for generating the writing region.

The step 104 further includes step 644: determining whether a distance between two adjacent leftmost coordinate points is greater than or equal to L/2, wherein L is a horizontal length of the screen display region.

In this step, please refer to FIG. 9, the distance between P1 and P2 is greater than or equal to L/2, that is, the value of a-c is greater than or equal to L/2. It is indicated that the distance between P1 and P2 is large enough to completely cover the possible horizontal length of the left handwriting among the two adjacent handwritings in the horizontal direction, thereby ensuring greater flexibility in setting a vertical dividing line between the two handwritings.

The step 104 further includes step 646: under a condition that the distance between the two adjacent leftmost coordinate points is greater than or equal to L/2, forming the writing regions by using a vertical centerline of the screen display region as a dividing line.

In this step, considering the greater flexibility in setting a vertical dividing line between the two handwritings, in order to facilitate the typesetting of the two handwritings, the vertical centerline of the display region is used as the boundary to form two writing regions of the same size.

In this embodiment, under a condition that the generated handwriting corresponds to two smart pens, and there is a sufficient distance between the two handwritings, that is, the distance between the two handwritings is L/2 or more, in order to better typeset the display region and coordinate the space utilization of the display region, the writing region corresponding to different handwriting may not be formed by setting the vertical dividing line referring to the leftmost coordinate point of the handwriting, but the vertical centerline of the display region may be used as the boundary to form two writing regions of the same size.

Figure 7:
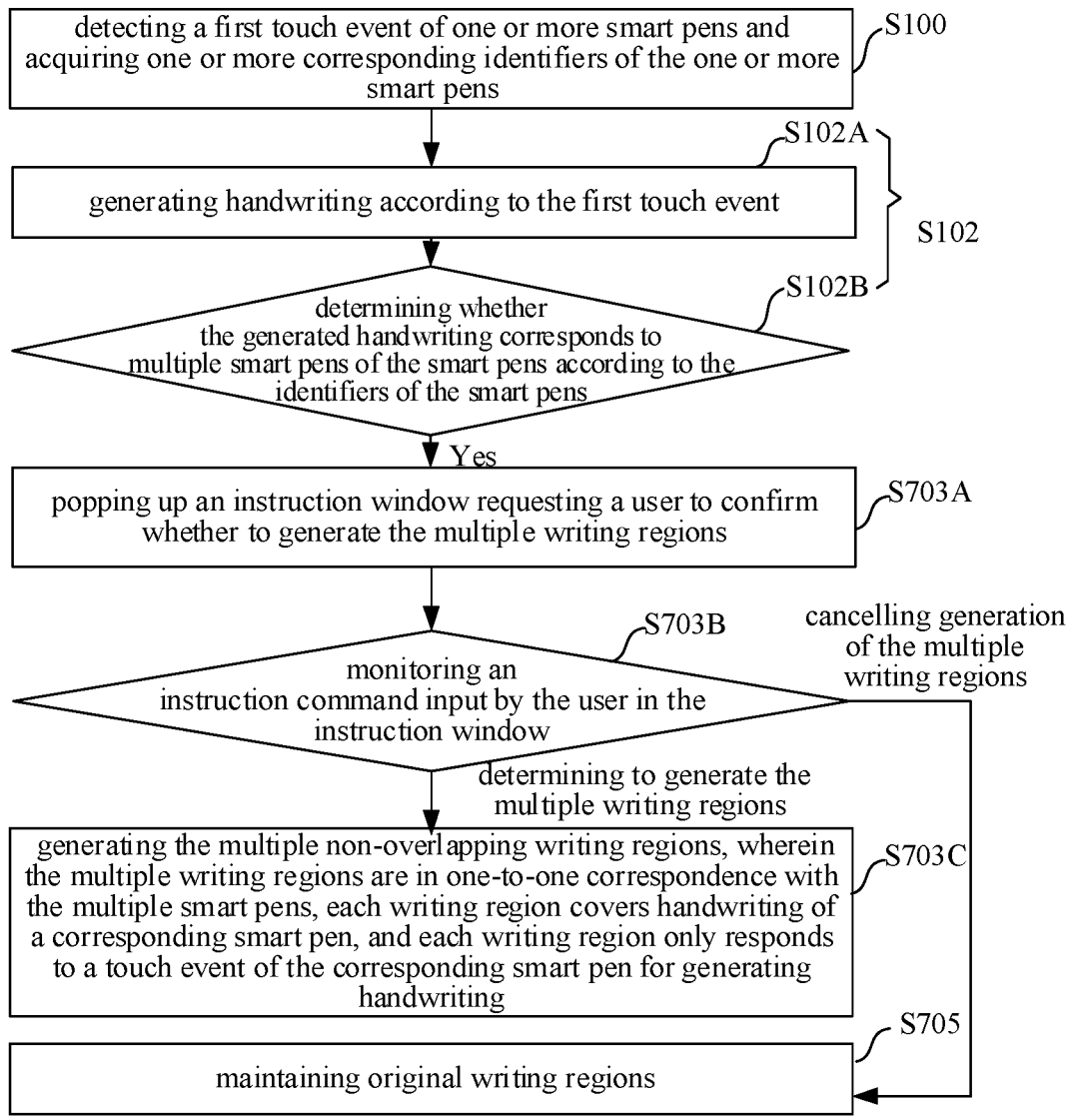
FIG. 7 is a flowchart of a seventh embodiment of a writing interaction method according to the present application.

Further, please refer to FIG. 7. FIG. 7 is a flowchart of a seventh embodiment of a writing interaction method according to the present application. The step 104 includes step 703A.

Step 703A: under a condition that the handwriting corresponds to the multiple smart pens, popping up an instruction window requesting a user to confirm whether to generate the multiple writing regions.

In this step, in order to give the user the right to choose whether to generate multiple writing regions, a pop-up window is set to request the user to confirm.

The step 104 further includes step 703B: monitoring an instruction command input by the user in the instruction window.

In this step, the input instruction command may be a touch event, a voice command, or a character command input from a keyboard. By monitoring the instruction command, it is convenient for the machine to perform subsequent actions according to the user's instruction.

The step 104 further includes step 703C: under a condition that a command of determining to generate the multiple writing regions is received from the user, generating the multiple non-overlapping writing regions, wherein the multiple writing regions are in one-to-one correspondence with the multiple smart pens, each writing region covers handwriting of a corresponding smart pen, and each writing region only responds to a touch event of the corresponding smart pen for generating handwriting.

In this step, multiple writing regions are generated only when a confirmed command is received, so as to more accurately meet the needs of the user.

After monitoring the instruction command input by the user in the instruction window, the writing interaction method further includes step 705.

Step 705: under a condition that a command of cancelling generation of the multiple writing regions is received from the user, maintaining original writing regions.

In this step, under a condition that a canceling command is received, the original writing regions are maintained, for example, multiple smart pens write in a same writing region. It is understandable that, optionally, under a condition that the newly added smart pen writes in one of the generated multiple writing regions, and the user chooses to cancel the instruction command of regenerating multiple writing regions, the identifier of the newly added smart pen may be included in that writing region, that is, the writing region can accept the writing input of two smart pens.

In this embodiment, a user confirmation process is set before determining whether to generate multiple writing regions, so that the smart interactive display device can more accurately meet the needs of the user, thereby achieving a better user experience.

Further, each writing region includes an editing region and a menu bar region, and the editing region of each writing region covers the handwriting corresponding to the smart pen and corresponds to the touch event of the smart pen; the menu bar region includes a writing main menu, and submenus of the writing main menu include color, eraser, and stroke thickness submenus.

In this embodiment, as shown in FIG. 10, the upper parts of the left and right writing regions are provided with a menu bar region, the square patterns in the menu bar in the figure represents graphic function buttons or icons, and the outside of the menu bar is the editing region. Of course, in some embodiments, the menu bar region can also be set to be hidden and can be called up when needed. Specifically, the user can set the color of the handwriting by invoking the color command, or erase the generated handwriting by invoking the eraser, and can also set the thickness of the handwriting by invoking the stroke thickness. By setting a menu bar region in each writing region, the user can independently edit the handwriting in each writing region.

Figure 8:
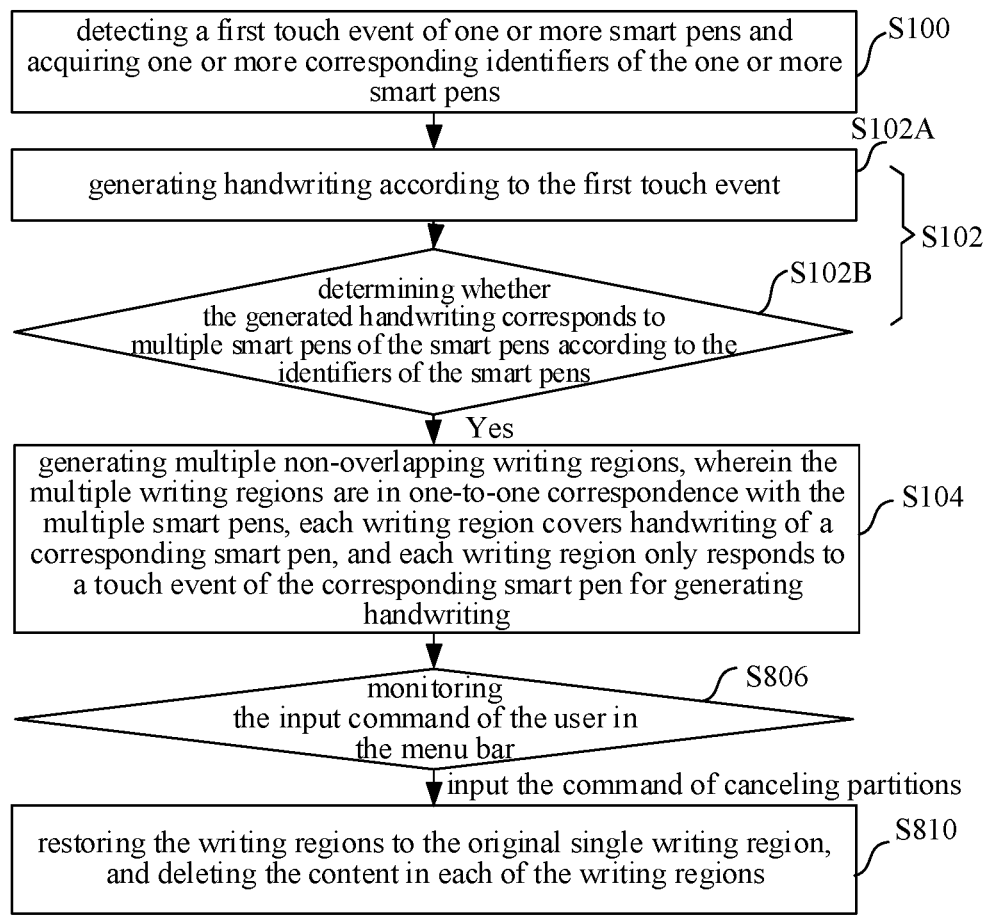
FIG. 8 is a flowchart of an eighth embodiment of a writing interaction method according to the present application.

Further, please refer to FIG. 8. FIG. 8 is a flowchart of an eighth embodiment of a writing interaction method according to the present application. The menu bar region includes a partition canceling main menu; the writing interaction method further includes step 806.

Step 806: monitoring the input command of the user in the menu bar.

In this step, which is similar to step 703B, the input instruction command may be a touch event, a voice command, or a character command input from a keyboard. By monitoring the instruction command, it is convenient for the machine to perform subsequent actions according to the user's instruction.

The writing interaction method further includes step 810: under a condition that the command of canceling the partitions is detected, restoring the writing regions to the original single writing region, and deleting the content in each of the writing regions.

In this step, under a condition that the user wants to cancel the partitions, a corresponding trigger command can be conveniently input in the menu bar, which restores the writing regions to the original single region, and deletes the content to quickly clear the screen. For example, in the classroom scene, the math class is coming to an end and the next class is English class. The display region of the smart interactive display device has multiple writing regions, all operators have finished writing, and the teacher or any operator can trigger the command of canceling the partitions. The screen can be quickly cleared, and it is convenient to use the writing interaction method of the smart interactive display device of the present application in English class.

In this embodiment, when the user wants to cancel multiple writing regions that have been generated and clear the screen, the user can use the partition canceling main menu to quickly achieve the goal.

Figure 11:
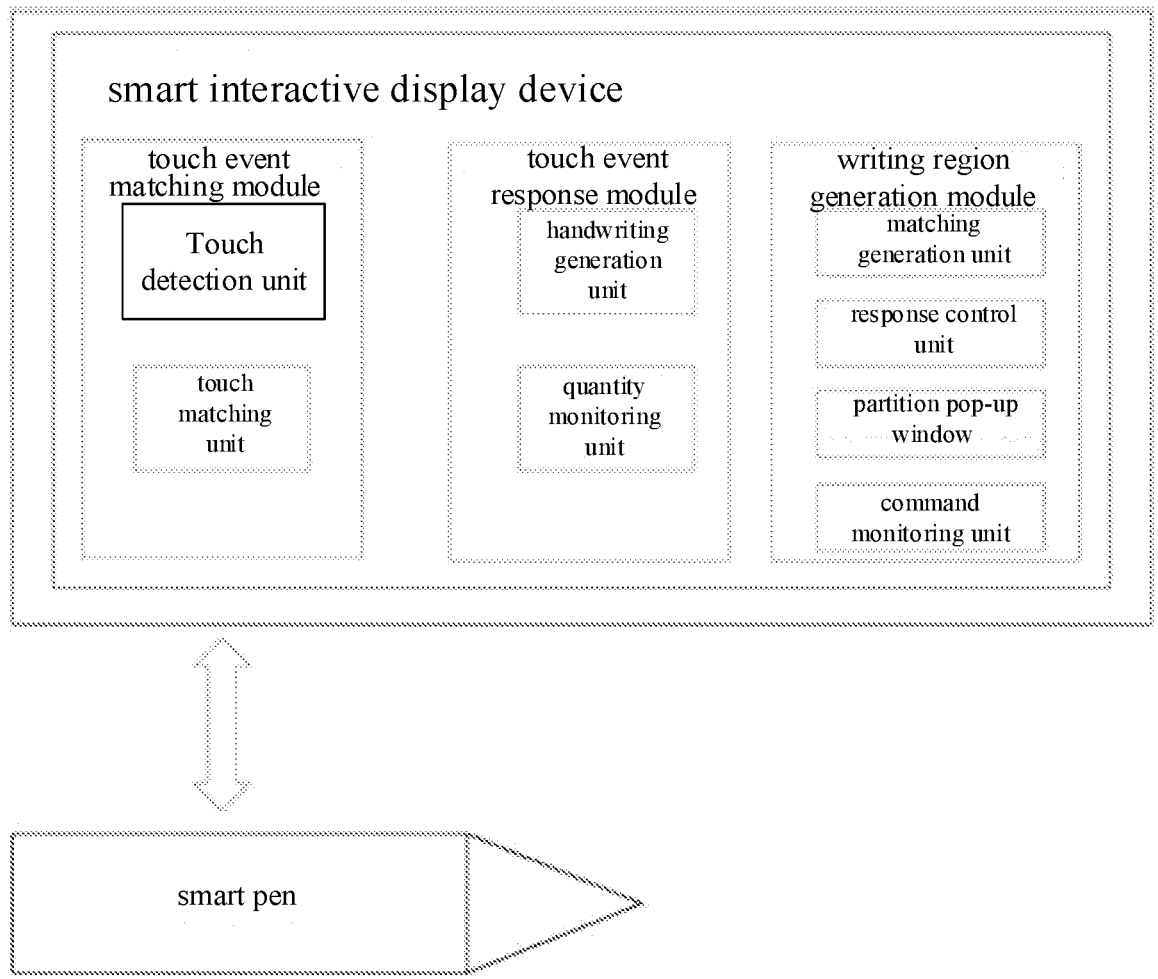
FIG. 11 is a module structure of an embodiment of a writing interaction system according to the present application.

The present application also provides a smart interactive display device for interacting with a smart pen. Please refer to FIG. 11, the smart interactive display device includes a touch event matching module, a touch event response module, and a writing area generation module, wherein, the touch event matching module includes a touch detection unit and a touch matching unit, the touch detection unit is configured to detect a first touch event of one or more smart pens, and the touch matching unit is configured to acquire one or more identifiers of the one or more smart pens and match the corresponding first touch event;

the touch event response module includes a handwriting generation unit and a quantity monitoring unit, the handwriting generation unit is configured to generate handwriting corresponding to the first touch event; the quantity monitoring unit is configured to determine whether the generated handwriting corresponds to multiple smart pens of the smart pens according to the identifiers of the smart pens;

the writing region generation module includes a matching generation unit and a response control unit, the matching generation unit is configured to generate multiple non-overlapping writing regions under a condition that the generated handwriting corresponds to the multiple smart pens, wherein the multiple writing regions are in one-to-one correspondence with the multiple smart pens, and each writing region covers handwriting of a corresponding smart pen; and the response control unit is configured to control each writing region to only respond to a touch event of the corresponding smart pen for generating handwriting.

Further, after the matching generation unit is configured to generate multiple non-overlapping writing regions, the touch detection unit is further configured to detect a second touch event of a smart pen, and the touch matching unit is further configured to acquire a identifier of the smart pen and match the corresponding second touch event;

the quantity monitoring unit is further configured to determine whether the second touch event is generated by a newly added smart pen according to the identifier of the smart pen;

the response control unit is further configured to determine whether the second touch event is generated in the generated writing regions according to a location where the second touch event is generated;

under a condition that the second touch event is generated in the generated writing regions, the handwriting generation unit is configured to generate no handwriting according to the second touch event, that is, the handwriting generation unit does not respond to generate handwriting;

under a condition that the second touch event is not generated in the generated writing regions, the handwriting generation unit is configured to generate handwriting according to the second touch event; the matching generation unit is further configured to generate a new writing region corresponding to the newly added smart pen, wherein the new writing region is not overlapped with the existing multiple writing regions, the new writing region covers the handwriting corresponding to the newly added smart pen, and the new writing region only responds to a touch event of the newly added smart pen for generating handwriting.

Further, after the matching generation unit is configured to generate multiple non-overlapping writing regions, the touch detection unit is further configured to detect a third touch event of a smart pen, and the touch matching unit is further configured to acquire an identifier of the smart pen and match the corresponding third touch event;

the quantity monitoring unit is further configured to determine whether the third touch event is generated by a newly added smart pen according to the identifier of the smart pen;

under a condition that the third touch event is generated by the newly added smart pen, the response control unit is further configured to determine whether the third touch event is generated in the generated writing regions according to a location where the third touch event is generated;

under a condition that the third touch event is generated in the generated writing regions, the matching generation unit is further configured to regenerate multiple non-overlapping writing regions, wherein the regenerated multiple writing regions are in one-to-one correspondence with the multiple smart pens and the newly added smart pen, each writing region covers a touch track of a corresponding smart pen, and each writing region only responds to a touch event of the corresponding smart pen for generating handwriting;

under a condition that third touch event is not generated in the generated writing regions, the matching generation unit is further configured to generate a new writing region corresponding to the newly added smart pen, wherein the new writing region is not overlapped with the existing multiple writing regions, the new writing region covers handwriting corresponding to the newly added smart pen, and the new writing region only responds to a touch event of the newly added smart pen for generating handwriting.

Further, after the matching generation unit is configured to generate multiple non-overlapping writing regions, the touch detection unit is further configured to detect a fourth touch event of a smart pen, and the touch matching unit is further configured to acquire an identifier of the smart pen and match the corresponding fourth touch event;

the quantity monitoring unit is further configured to determine whether the fourth touch event is generated by a newly added smart pen according to the identifier of the smart pen;

under a condition that the fourth touch event is not generated by the newly added smart pen, the response control unit is further configured to determine whether the fourth touch event is generated in the generated writing regions according to a location where the fourth touch event is generated;

under a condition that the fourth touch event is not generated in the generated writing regions, the matching generation unit is further configured to tentatively expand the writing region corresponding to the smart pen according to a preset rule, so as to cover a track corresponding to the fourth touch event, and determine whether the tentatively expanded writing region overlaps with other writing regions;

under a condition that the tentatively expanded writing region overlaps with the other writing regions, the matching generation unit is further configured to cancel expansion of the writing region corresponding to the smart pen, and the handwriting generation unit is configured to generate no handwriting according to the fourth touch event;

under a condition that the tentatively expanded writing region is not overlapped with the other writing regions, the matching generation unit is further configured to expand the writing region corresponding to the smart pen, and the handwriting generation unit is configured to generate handwriting according to the fourth touch event.

Further, the matching generation unit includes a reference point acquisition unit, a distance determination unit and a region generation unit, wherein, the reference point acquisition unit is configured to acquire a location of a leftmost coordinate point of the handwriting corresponding to each smart pen under a condition that the generated handwriting corresponds to the multiple smart pens;

the distance determination unit is configured to determine whether a distance between two adjacent leftmost coordinate points is greater than or equal to a first preset distance;

under a condition that the result of the distance determination unit is yes, the region generation unit is configured to generate the multiple non-overlapping writing regions on a screen display region.

Further, the region generation unit is specifically configured to:

under a condition that the distance between the two adjacent leftmost coordinate points is greater than or equal to the first preset distance, except for a leftmost coordinate point close to a left side of the screen display region, form the writing regions by setting vertical dividing lines referring to the other leftmost coordinate points, wherein the first preset distance is equal to a product of δ and L, L is a horizontal length of the screen display region, and δ is less than 0.5; or under a condition that the distance between the two adjacent leftmost coordinate points is greater than or equal to the first preset distance, form the writing regions by using a vertical centerline of the screen display region as a dividing line, wherein the first preset distance is equal to L/2, where L is the horizontal length of the screen display region.

Further, the writing region generation module also includes a partition pop-up window unit and a command monitoring unit, wherein, under a condition that the generated handwriting corresponds to the multiple smart pens, the partition pop-up window unit is configured to pop up an instruction window requesting a user to confirm whether to generate the multiple writing regions;

the command monitoring unit is configured to monitor an instruction command input by the user in the instruction window;

under a condition that a command of determining to generate the multiple writing regions is received from the user, the matching generation unit is further configured to generate the multiple non-overlapping writing regions, wherein the multiple writing regions are in one-to-one correspondence with the multiple smart pens, each writing region covers handwriting of a corresponding smart pen, and each writing region only responds to a touch event of the corresponding smart pen for generating handwriting, under a condition that a command of cancelling generation of the multiple writing regions is received from the user, the matching generation unit is further configured to maintain original writing regions.

Further, each writing region includes an editing region and a menu bar region, and the editing region of each writing region covers the handwriting corresponding to the smart pen and corresponds to the touch event of the smart pen; the menu bar region includes a writing main menu, and submenus of the writing main menu include color, eraser, and stroke thickness submenus.

Further, the writing region generation module further includes a command monitoring unit, the command monitoring unit monitors the input command of the user in the menu bar; under a condition that the command monitoring unit detects the command of canceling the partitions, the matching generation module is further configured to restore the writing regions to the original single writing region, and delete the content in each of the writing regions.

For the specific description of each module and unit of the smart interactive display device involved in each embodiment of the present application, reference may be made to the specific description of the embodiments corresponding to the writing interaction method, which is not repeated here.

The present application also provides a smart interactive display device, including a capacitive touch screen, a processor, and a computer-readable storage medium, wherein the computer-readable storage medium stores a writing interaction program, and the writing interaction program, when being executed, implements the writing interaction method as described above. The specific steps of the writing interaction method may refer to the above embodiments. Since the smart interactive display device adopts all technical solutions of the above embodiments, it has at least all beneficial effects brought by the technical solutions of the above embodiments, will not be repeated here.

The present application also provides a writing interactive system, including a smart pen and the above smart interactive display device including various modules. The specific structure of the smart interactive display device may refer to the above embodiments. Since the smart interactive display device adopts all technical solutions of the above embodiments, it has at least all beneficial effects brought by the technical solutions of the above embodiments, will not be repeated here.

The present application also provides a writing interactive system, including an active capacitive smart pen and the above smart interactive display device including the computer storage medium. The specific structure of the smart interactive display device and the steps implemented by executing the writing interactive program may refer to the above embodiments. Since the writing interactive system adopts all technical solutions of the above embodiments, it has at least all beneficial effects brought by the technical solutions of the above embodiments, will not be repeated here.

It should be noted that, in the present application, the terms "comprise", "include", or any other variants thereof, are intended to represent a non-exclusive inclusion, such that a process, method, article or device including a series of elements includes not only those elements, but also other elements that are not explicitly listed or elements inherent to such a process, method, article or device. Without more constraints, the elements following an expression "comprise/include . . . " do not exclude the existence of additional identical elements in the process, method, article or device that includes the elements.

In the present application, relational terms, such as first and second, are used merely to distinguish one entity or operation from another entity or operation, without necessarily requiring or implying any actual such relationships or orders of these entities or operations.

The above serial numbers of the embodiments of the present application are only for description, and do not represent the advantages or disadvantages of the embodiments.

According to the description of the above embodiments, those skilled in the art can clearly understand that the methods of the above embodiments can be implemented by means of software plus a necessary general hardware platform, and of course can also be implemented by hardware or software, but in many cases, the former is a better implementation. Based on this understanding, the technical solutions of the present application or the parts that make contributions to the prior art can be embodied in the form of software products. The computer software products are stored in a storage medium (such as a ROM/RAM, a magnetic disk, an optical disk) as described above, including several instructions to make a terminal device (which may be a mobile phone, a computer, a server, an air conditioner, or a network device) execute the methods described in the various embodiments of the present application.

Those skilled in the art can understand that, on the premise of no conflict, the above solutions can be combined and superimposed freely.

It should be understood that the above embodiments are only exemplary rather than restrictive, and without departing from the basic principles of the present application, those skilled in the art can make various obvious or equivalent modifications or substitutions to the above details, which will all be included within the scope of the claims of the present application.

What is claimed is:

1. A writing interaction method, comprising:
    detecting a first touch event of one or more smart pens and acquiring one or more corresponding identifiers of the one or more smart pens;
    generating handwriting according to the first touch event, and determining whether the generated handwriting corresponds to multiple smart pens of the smart pens according to the identifiers of the smart pens;
    under a condition that the handwriting corresponds to the multiple smart pens, generating multiple non-overlapping writing regions, wherein the multiple writing regions are in one-to-one correspondence with the multiple smart pens, each writing region covers handwriting of a corresponding smart pen, and each writing region only responds to a touch event of the corresponding smart pen for generating handwriting.

2. The writing interaction method according to claim 1, further comprising:
    detecting a second touch event of a smart pen and acquiring a corresponding identifier of the smart pen;
    determining whether the second touch event is generated by a newly added smart pen according to the identifier of the smart pen;
    under a condition that the second touch event is generated by the newly added smart pen, determining whether the second touch event is generated in the generated writing regions according to a location where the second touch event is generated;
    under a condition that the second touch event is generated in the generated writing regions, generating no handwriting according to the second touch event;
    under a condition that the second touch event is not generated in the generated writing regions, generating handwriting according to the second touch event, and generating a new writing region corresponding to the newly added smart pen, wherein the new writing region is not overlapped with the existing multiple writing regions, the new writing region covers the handwriting corresponding to the newly added smart pen, and the new writing region only responds to a touch event of the newly added smart pen for generating handwriting.

3. The writing interaction method according to claim 1, further comprising:
    detecting a third touch event of a smart pen and acquiring a corresponding identifier of the smart pen;
    determining whether the third touch event is generated by a newly added smart pen according to the identifier of the smart pen;
    under a condition that the third touch event is generated by the newly added smart pen, determining whether the third touch event is generated in the generated writing regions according to a location where the third touch event is generated;
    under a condition that the third touch event is generated in the generated writing regions, regenerating multiple non-overlapping writing regions, wherein the regenerated multiple writing regions are in one-to-one correspondence with the multiple smart pens and the newly added smart pen, each writing region covers a touch track of a corresponding smart pen, and each writing region only responds to a touch event of the corresponding smart pen for generating handwriting;
    under a condition that third touch event is not generated in the generated writing regions, generating a new writing region corresponding to the newly added smart pen, wherein the new writing region is not overlapped with the existing multiple writing regions, the new writing region covers handwriting corresponding to the newly added smart pen, and the new writing region only responds to a touch event of the newly added smart pen for generating handwriting.

4. The writing interaction method according to claim 1, further comprising:
    detecting a fourth touch event of a smart pen and acquiring a corresponding identifier of the smart pen;
    determining whether the fourth touch event is generated by a newly added smart pen according to the identifier of the smart pen;
    under a condition that the fourth touch event is not generated by the newly added smart pen, determining whether the fourth touch event is generated in the generated writing regions according to a location where the fourth touch event is generated;
    under a condition that the fourth touch event is not generated in the generated writing regions, tentatively expanding the writing region corresponding to the smart pen according to a preset rule, so as to cover a track corresponding to the fourth touch event;
    determining whether the tentatively expanded writing region overlaps with other writing regions;
    under a condition that the tentatively expanded writing region overlaps with the other writing regions, canceling expansion of the writing region corresponding to the smart pen and generating no handwriting according to the fourth touch event;

under a condition that the tentatively expanded writing region is not overlapped with the other writing regions, expanding the writing region corresponding to the smart pen and generating handwriting according to the fourth touch event.

5. The writing interaction method according to claim 1, wherein the step of under a condition that the handwriting corresponds to the multiple smart pens, generating multiple non-overlapping writing regions specifically comprises:
acquiring a location of a leftmost coordinate point of the handwriting corresponding to each smart pen;
determining whether a distance between two adjacent leftmost coordinate points is greater than or equal to a first preset distance;
under a condition that the distance between the two adjacent leftmost coordinate points is greater than or equal to the first preset distance, generating the multiple non-overlapping writing regions on a screen display region.

6. The writing interaction method according to claim 5, wherein under a condition that the distance between the two adjacent leftmost coordinate points is greater than or equal to the first preset distance, generating the multiple non-overlapping writing regions on a screen display region comprises:
under a condition that the distance between the two adjacent leftmost coordinate points is greater than or equal to the first preset distance, except for a leftmost coordinate point close to a left side of the screen display region, forming the writing regions by setting vertical dividing lines referring to the other leftmost coordinate points, wherein the first preset distance is equal to a product of δ and L, L is a horizontal length of the screen display region, and δ is less than 0.5; or
under a condition that the distance between the two adjacent leftmost coordinate points is greater than or equal to the first preset distance, forming the writing regions by using a vertical centerline of the screen display region as a dividing line, wherein the first preset distance is equal to L/2, where L is the horizontal length of the screen display region.

7. The writing interaction method according to claim 1, wherein the step of under a condition that the handwriting corresponds to the multiple smart pens, generating multiple non-overlapping writing regions comprises:
under a condition that the handwriting corresponds to the multiple smart pens, popping up an instruction window requesting a user to confirm whether to generate the multiple writing regions;
monitoring an instruction command input by the user in the instruction window;
under a condition that a command of determining to generate the multiple writing regions is received from the user, generating the multiple non-overlapping writing regions, wherein the multiple writing regions are in one-to-one correspondence with the multiple smart pens, each writing region covers handwriting of a corresponding smart pen, and each writing region only responds to a touch event of the corresponding smart pen for generating handwriting,
after monitoring the instruction command input by the user in the instruction window, the method further comprises:
under a condition that a command of cancelling generation of the multiple writing regions is received from the user, maintaining original writing regions.

8. A smart interactive display device, comprising a capacitive touch screen, a processor and a computer-readable storage medium, wherein the computer-readable storage medium stores a writing interaction program, and the writing interaction program, when being executed, implements the writing interaction method according to claim 1.

9. A writing interaction system, comprising a smart pen and the smart interactive display device according to claim 8.

* * * * *